Jan. 25, 1966  P. C. SCHMITT  3,230,948
OPEN-AIR ROASTER
Filed May 12, 1964  2 Sheets-Sheet 1
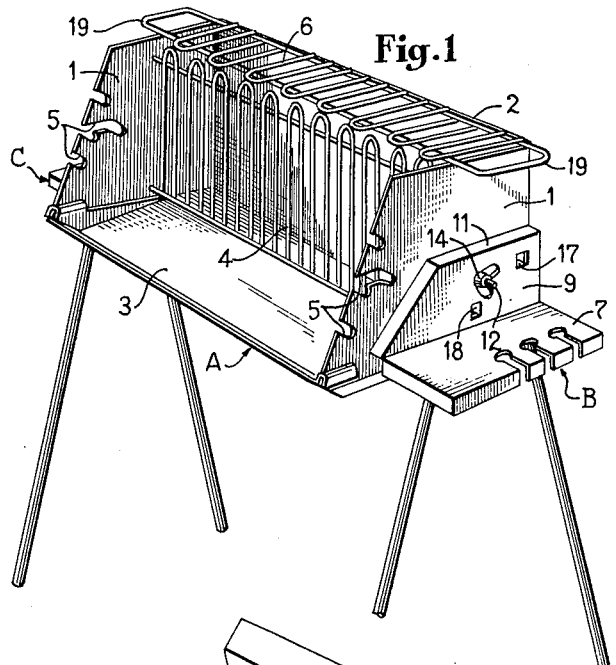
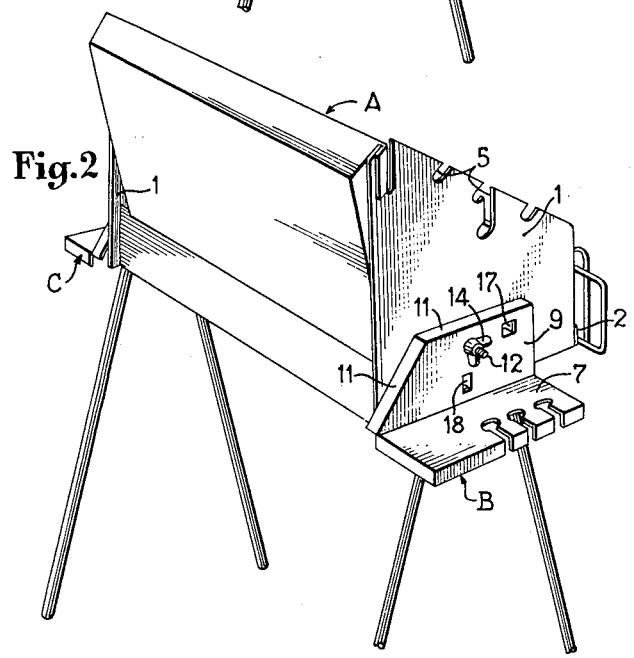
Inventor:
Paul, Charles SCHMITT
by J. Delatre Seguy
Attorney

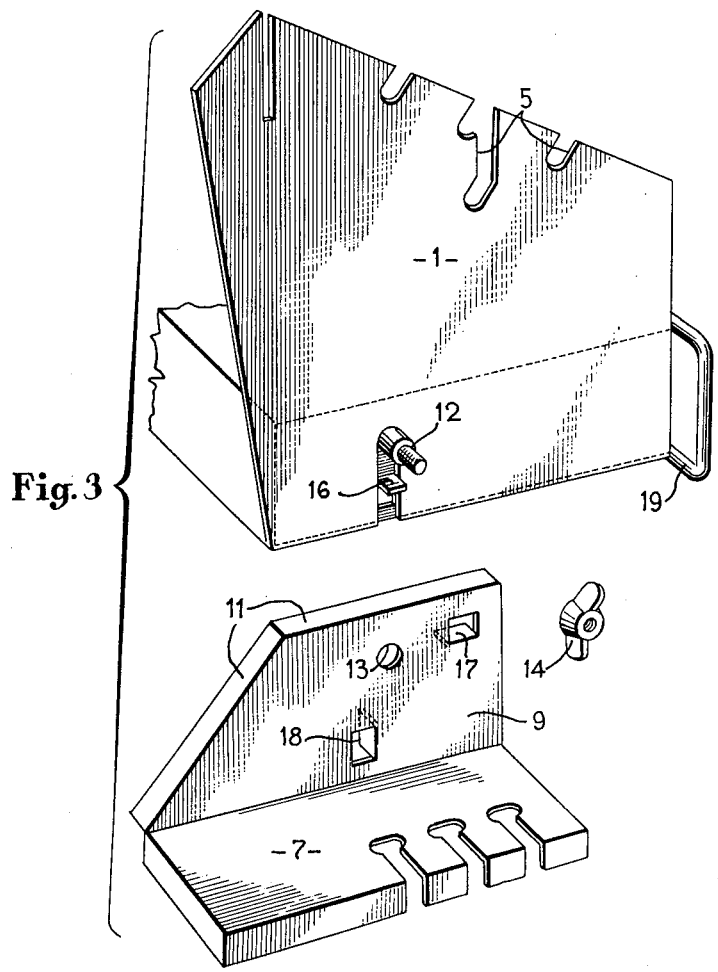

United States Patent Office 3,230,948
Patented Jan. 25, 1966

3,230,948
OPEN-AIR ROASTER
Paul Charles Schmitt, Fresnoy-le-Grand, France, assignor to Le Creuset, Fresnoy-le-Grand, France, a corporation of France
Filed May 12, 1964, Ser. No. 366,721
Claims priority, application France, May 14, 1963, 934,824
6 Claims. (Cl. 126—25)

The present invention relates to open-air roasters, commonly known as barbecues, which comprise a cooking assembly including a vertical hearth defined by a rear plate and a front grill in front of which is disposed a rotating spit. It has already been proposed to so arrange such a barbecue that the cooking assembly can be placed in a position in which the hearth is horizontal and constitutes a grill which permits utilizing, in particular after the roasting on the spit, the residual embers for toasting bread, or grilling fish, vegetables, meat etc.

In known barbecues, two lateral supports are provided and the roaster is turned into a grill by permuting the two supports. This is a rather delicate procedure when it follows immediately after utilization of the roaster, since it requires taking apart and then reassembling very hot parts and there is a risk of burning one's fingers or clothes.

The object of the invention is to provide a barbecue which is so arranged that the roaster can be turned into a grill almost instantaneously with no risk of burning.

The barbecue according to the invention comprises a horizontal pivot axis for the cooking assembly embodied by two trunnions which extend through the respective supports and are capable of being blocked by rapid clamping means in either one of two positions corresponding to a vertical position and a horizontal position for the hearth grill. When the clamping means are released after roasting on the spit, the cooking assembly can be taken hold of by handles normally provided in regions remote from the zone in which the hearth emits its radiations and then pivoted through 90° so as to assume the position in which the grill is horizontal and is available for preparing grilled meat.

Further features and advantages of the invention will be apparent from the ensuing description with reference to the accompanying drawings to which the invention is in no way limited.

In the drawings:

FIG. 1 is a perspective view of the barbecue in the position in which it is employed as a roaster;

FIG. 2 is a corresponding view in which the cooking assembly has been pivoted through 90° from the position shown in FIG. 1 so as to enable the barbecue to be used as a grill, and FIG. 3 is an exploded perspective view showing the manner in which one end of the cooking assembly is mounted on the corresponding support.

The barbecue shown in FIG. 1 in the position in which it is employed as a roaster comprises a cooking assembly A mounted on two lateral independent supports B, C each of which is provided with two legs adapted to bear on the ground.

With reference to FIG. 1, the cooking assembly A includes two side walls 1 between which are disposed a hearth 2 and a gravy or sauce collecting pan 3. The hearth or oven constitutes a rectangular-sided vessel whose forward face is formed by a grill 4 so that when the hearth is charged with glowing embers, a piece of meat carried by a rotating spit mounted in notches 5 in the walls 1 is cooked. An auxiliary grill 6 is provided on the top of the hearth for the simultaneous preparation of grilled meat.

Each support B or C comprises a bracket whose horizontal branch 7 acts as a table whereas the vertical branch 9, formed by a plate having flanges 11 is assembled with the corresponding wall 1. For this puropse, a trunnion 12 rigid with the side wall 1 extends through an opening 13 in the vertical plate 9 and has a screwthreaded end on which is screwed a wing nut 14. When the latter is tightened, it applies the flanges 11 against the adjacent side wall 1 and thus holds the support and the cooking assembly together in one unit. The two trunnions 12 of the side walls embody, in combination with the opening 13 in the plates 9 which act as bearings, a pivot axis for the cooking assembly so that the latter can be pivoted, after the nuts 14 have been loosened, between the position shown in FIG. 1 and that shown in FIG. 2 in which the grill 4 of the hearth is respectively vertical and horizontal. These two positions are determined by the co-operation of a tab or lug 16 formed on each side wall 1 with either of two abutments 17, 18 which are provided on the plate 9 and angularly spaced apart 90° relative to the opening 13. The lug 16 and the abutments 17, 18 are obtained in lancing the corresponding metal sheets and forming up the tabs of metal. In FIG. 1 the lug 16 bears against the upper abutment 17 and in FIG. 2 the lug 16 is applied against the lower abutment 18.

It will be observed that in order to pivot the cooking assembly from the roasting position shown in FIG. 1 to the grilling position shown in FIG. 2, it is advantageous to employ handles 19 which laterally project from the walls 1 of the furnace so that when the latter is filled with hot embers the operation can be effected without any risk of burning oneself. An insulating covering could, moreover, be provided on the two handles.

The elements of the cooking assembly and the legs of the support B, C are advantageously separable so as to enable the barbecue to be easily transported, for example in a relatively small bag.

Although specific embodiments of the invention have been described, many modifications and changes may be made therein without departing from the scope of the invention as defined in the appended claims.

Having now described my invention what I claim as new and desire to secure by Letters Patent is:

1. An open-air barbecue comprising a cooking assembly and support means for the cooking assembly, the cooking assembly comprising a body having a longitudinal wall and two lateral walls, a grill supported by the body and in spaced relation to the longitudinal wall so as to define a hearth, means for mounting a rotary spit in a position adjacent the grill, two trunnions fixed respectively to the lataral walls and embodying a longitudinal pivot axis, the support means comprising two independent support leg units, the trunnions being respectively pivotally mounted in the support units, two abutments toward which the cooking assembly is pivotal about said axis between a first limit position determined by one of said abutments in which the grill is substantially vertical and a second limit position determined by the other of said abutments in which the grill is substantially horizontal, the trunnions being screwthreaded and clamping nuts being respectively threadedly engaged on the trunnions with interposition of the support units, whereby the cooking assembly can be axially clamped to the support units in any position between said two limit positions by tightening the nuts and completely detached from the support units to facilitate transportion of the barbecue.

2. A barbecue as claimed in claim 1, wherein the lateral walls are flat, each support unit comprises a flat sheet metal plate in which the corresponding trunnion is pivotally mounted, flanges directed toward the corresponding lateral wall being formed on the plate and having edges in contact with the flat lateral wall, whereby the edges of the flanges are clamped axially against the lateral wall by the nut through the medium of the sheet metal plate which provides a slightly resilient clamping.

3. An open-air barbecue comprising a cooking assembly and support means for the cooking assembly, the cooking assembly comprising a body having a longitudinal wall and two lateral walls, a grill supported by the body and in spaced relation to the longitudinal wall so as to define a hearth, support means for a rotary spit disposed adjacent the grill, two trunnions fixed respectively to the lateral walls and embodying a longitudinal pivot axis, the support means consisting of two independent parallel support units, unattached to each other, and each comprising a flat vertical sheet metal plate, the trunnions extending through an opening in said metal plates and being respectively pivotally mounted in the support units, the cooking assembly being pivotal about said axis between a first position in which the grill is substantially vertical and a second position in which the grill is substantially horizontal, and rapid releasable locking means interposed between the cooking assembly and the support means for locking the cooking assembly to the support means in any position between said two positions, the first and second positions of the cooking assembly being determined by a lug provided on each lateral wall and two abutments provided on each support unit, the abutments being struck out of said metal plates and being angularly offset from each other relative to said pivot axis and contained in a plane perpendicular to said axis and the lug being disposed between the abutments and contained in said plane whereby the lug encounters and is stopped by the abutments in pivoting about said axis.

4. An open-air barbecue comprising a first element constituting a cooking assembly and a second element constituting support means for the cooking assembly, the cooking assembly comprising a body having a longitudinal wall and two vertical lateral walls, a grill supported by the body and in spaced relation to the longitudinal wall so as to define a hearth, means for mounting a rotary spit in a position adjacent the grill, two trunnions fixed respectively to the lateral walls and embodying a longitudinal pivot axis, the support means comprising two independent vertical side plates having depending supporting legs and respectively in lateral abutting relation to the lateral walls, the legs of each side plate being independent of and unattached to the legs of the other side plate, whereby the side plates and their corresponding legs can be separately detached from the cooking assembly, said plates having apertures in which the trunnions are respectively rotatively mounted, the trunnions respectively having retaining members clamping the corresponding plate against the adjoining lateral wall, the retaining members being detachably secured to the trunnions by a screw-threaded engagement therewith whereby screwing the retaining members in one direction clamps the plates against the corresponding lateral walls in any angular position and prevents the cooking assembly from pivoting about said axis and unscrewing the retaining members from the trunnions permits disconnecting the plates and legs from the cooking assembly for packing purposes, abutment means allowing the cooking assembly a limited pivotal movement about said axis, the abutment means comprising a lug fixed to one of said first and second elements and two abutments fixed to the other of said elements in such spaced relation to each other and in such position as to be encountered by the lug in the pivoting of the cooking assembly about said axis and thereby limit the free pivotal movement of the lug and the cooking assembly between a first limit position in which the grill is substantially vertical and a second limit position in which the grill is substantially horizontal.

5. An open-air barbecue comprising a first element constituting a cooking assembly and further elements constituting support means for the cooking assembly, the cooking assembly comprising a body having a longitudinal wall portion and two lateral walls, a grill supported by the body and in spaced relation to the longitudinal wall portion so as to define a hearth, means for mounting a rotary spit located adjacent the grill, said support means comprising two independent parallel support units, each of said support units comprising a flat vertical sheet metal plate; two pivotal mounting means embodying a longitudinal pivot axis and pivotally mounted in the corresponding flat metal plates, said pivot axis interconnecting the cooking assembly and the support means; abutment means allowing the cooking assembly a limited free pivotal movement about said axis, the abutment means comprising a lug fixed to said first element and two abutments struck out of at least one of said two flat metal plates and fixed thereto, said abutments being in such spaced relation to each other and in such position as to be encountered by the lug in the pivoting of the cooking assembly about said axis and thereby limit the free pivotal movement of the lug and of the cooking assembly between a first limit position in which the grill is substantially vertical and a second limit position in which the grill is substantially horizontal, and rapid releasable locking means interposed between the cooking assembly and the support means for locking the cooking assembly to the support means.

6. An open-air barbecue comprising a first element constituting a cooking assembly and further elements constituting support means for the cooking assembly, the cooking assembly comprising a body having a longitudinal wall and two lateral walls; a grill supported by the body and in spaced relation to the longitudinal wall so as to define a hearth; means for mounting a rotary spit in a position adjacent the grill; two trunnions fixed respectively to the lateral walls and embodying a longitudinal pivot axis; the support means consisting of two separate independent parallel support units adapted to be placed on the ground, each support unit comprising a flat vertical sheet metal plate, the trunnions extending through an opening in said metal plates and being respectively pivotally mounted in the support units and readily detachable from the support units to facilitate packing and transportation of the barbecue; abutment means allowing the cooking assembly a limited free pivotal movement about said axis; the abutment means comprising a lug fixed to said first element and two abutments struck out of at least one of said two flat metal plates and fixed thereto in such spaced relation to each other and in such position as to be encountered by the lug in the pivoting of the cooking assembly about said axis and thereby limit the free pivotal movement of the lug and of the cooking assembly between a first limit position in which the grill is substantially vertical and a second limit position in which the grill is substantially horizontal, and rapid releasable clamping means threadedly engaging said trunnions interposed between the cooking assembly and the support means for clamping the cooking assembly to the support means and detaching it from said support means.

References Cited by the Examiner

UNITED STATES PATENTS

| 1,368,184 | 2/1921 | Merck | 248—128 |
|---|---|---|---|
| 2,512,223 | 6/1950 | Coutiguglia | 99—421 |
| 2,573,988 | 11/1951 | Saltzberg | 99—421 |
| 2,631,216 | 3/1953 | Ames | 99—340 |
| 2,718,845 | 9/1955 | Dudley | 99—421 |
| 3,018,772 | 1/1962 | Blazey | 99—340 |
| 3,106,150 | 10/1963 | Gaeke | 99—340 |

WALTER A. SCHEEL, *Primary Examiner.*

ROBERT E. PULFREY, *Examiner.*